Patented June 20, 1944

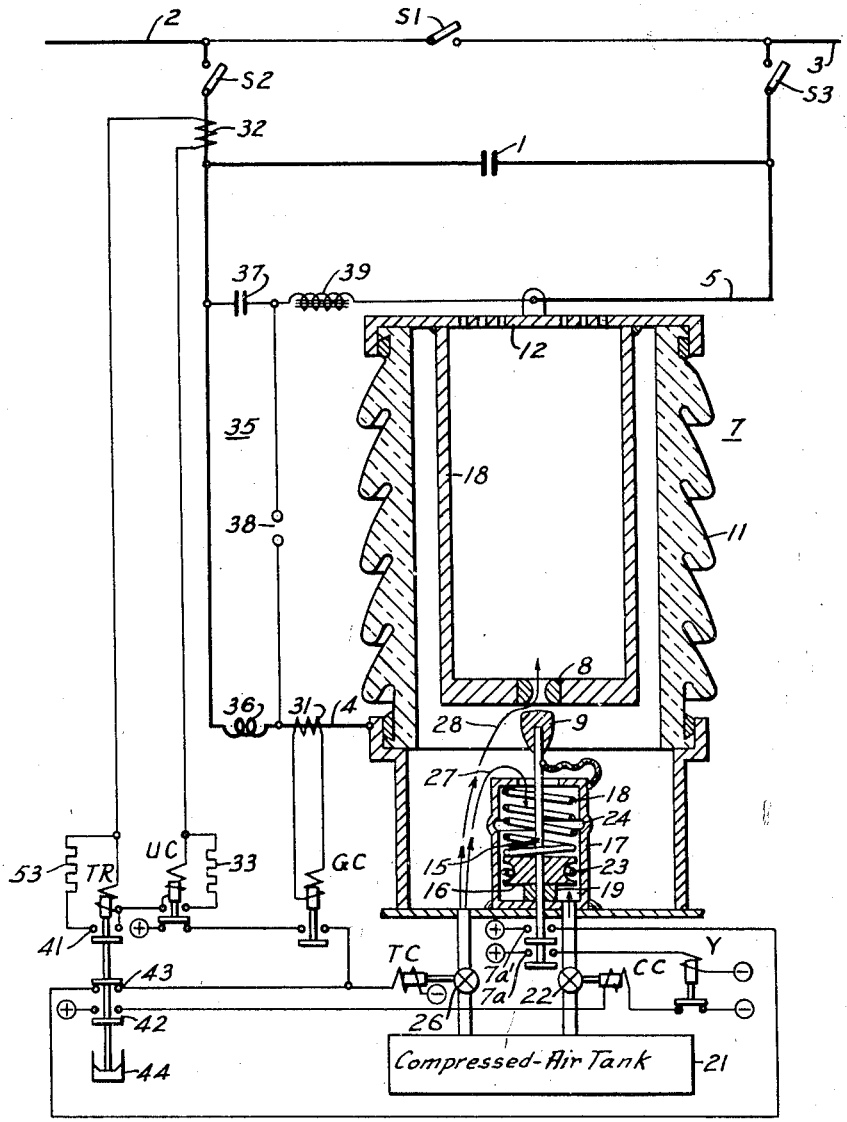

2,351,988

UNITED STATES PATENT OFFICE 2,351,988

SERIES CAPACITOR PROTECTION

Ralph E. Marbury and Leon R. Ludwig, Wilkinsburg, and Benjamin P. Baker, Turtle Creek, Pa., assignors to Westinghouse Electric & Manufacturing Company, East Pittsburgh, Pa., a corporation of Pennsylvania Application June 12, 1942, Serial No. 446,740

11 Claims. (Cl. 175—294)

Our invention relates to protected series-capacitors for synchronous transmission-systems, particularly those systems of such reactance and voltage that stability is a limiting consideration in the operation of the system.

This invention is a development out of, and improvement upon, the inventions described and claimed in a copending application of Evans, Marbury and Monteith, Serial No. 445,562, filed June 3, 1942, and a copending application of Ludwig and Fields, Serial No. 437,636, filed April 4, 1942, both assigned to the Westinghouse Electric & Manufacturing Company. In the Evans et al. application, it was shown how means could be provided for protecting a series capacitor that was insulated for a voltage corresponding to the voltage-drop when traversed by the full-load current of the line, the protective-means providing a bypassing gap-device, and means for effecting the extinguishment of the arc in the gap-device, and a restoration of the series capacitor to service, in time sufficiently short to be of material benefit in maintaining system-stability in the critical period immediately following the clearing of a fault by the protective equipment on the line. In the Ludwig et al. application, it was shown how the above-mentioned functions could be conveniently accomplished by extinguishing the arc in the protective gap-device by means of a gas-blast. This gas-blast gap-means was only one of many expedients which have been suggested and investigated in an effort to find the most completely satisfactory answer to the many practical problems necessary to any commercially satisfactory solution of the serious proposal to use series capacitors as an operative part of a high-voltage or high-reactance transmission-line as a means for operating the line to transmit more power than could otherwise be handled with stability and reliability.

In any air-blast system of terminating the arcing of a protective gap around a series capacitor, particularly a series capacitor for a line of the type previously mentioned (although our invention is not limited to this particular application), it is necessary, as pointed out in the previously mentioned applications, to provide means for, at times, bypassing the capacitor and the protective gap with a gap-free all-conductor circuit, which means some sort of mechanically moving circuit-closing operation, either to enable the disconnecting and bypassing connectors or switches to be operated for disconnecting the series capacitor from the line for service or maintenance-operations, or to protect the protective gap from destruction from an abnormally protracted arcing-period. Heretofore, this circuit-closing operation has necessitated additional equipment, in addition to the protective gap-device, and this has added materially to the cost and complication of the complete protective equipment for the series capacitor.

An object of our invention is to provide a single gas-blast circuit-breaker which is utilized, in its open position, as the protective gap for protecting the series capacitor against overvoltages, the gas-blast being turned on when it is time to extinguish the arc, and the circuit-breaker being closed when a circuit-closing operation is required, either for servicing the series capacitor, or for protecting the apparatus from damage resulting from a long-protracted arcing-period. For this purpose, a gas-blast circuit-breaker was needed, rather than an oil-immersed circuit breaker, because it is necessary that the device, when used, in its open position, as an arcing gap, with an arc playing for several cycles across the gap between its separated electrodes, to have a low recovery-voltage, so that the arc will promptly restrike at a low-voltage point in each half-cycle after a current-zero, the arc-extinguishing means being kept substantially off of the arc during the period when a low-voltage, easily restriking arc is needed for the protection of the series capacitor without imposing severe switching-surges on the transmission line as a result of high-voltage arc-striking.

With the foregoing and other objects in view, our invention consists in the apparatus, parts, combinations, methods and systems hereinafter described and claimed, and illustrated in the accompanying drawing, the single figure of which is a diagrammatic view of circuits and apparatus embodying our invention in a form which is at present preferred.

Our invention is illustrated as being applied to the protection of a series capacitor 1 which is connected, through suitable bypassing and disconnect switches S1, S2 and S3, in series with a line-conductor 2, 3 of an electric power-supply line of any description. We particularly have in mind, at the present moment, a polyphase synchronous transmission line or system in which stability is a problem, in holding synchronous machines in synchronism at distant points, but our invention obviously is applicable wherever series capacitors are utilized.

The series capacitor 1, which will usually be a bank of capacitors, is shunted or bypassed by a circuit 4—5 which includes an air-blast circuit-breaker 7 having stationary and movable main-contacts 8 and 9, which are normally in the open position, as shown. We utilize these open breaker-contacts 8 and 9 as a protective gap-device for flashing over, or breaking down, in response to a predetermined overvoltage on the series capacitor 1, so as to cause a low-voltage arc to play across the gap between the open contacts 8 and 9.

In order to protect the series capacitor 1 against the overvoltages which would occur thereon if line-current of fault-magnitude were permitted to flow therethrough during the four cycles, more or less, required for clearing the fault from the transmission-line (through line sectionalizing breakers and line-protective relays, not shown), it is necessary for the bypassing-arc at the gap 8—9 to continue to play for at least the four cycles, or other fault-clearing time. In order to protect the transmission system against transients similar to switching-transients, it is necessary for the gap-arc at 8—9 to be of a type which tenaciously hangs on, restriking itself early in the half-cycle following each current-zero, so that the arc is almost continuously in play, with a low restriking-voltage after each current-zero.

The necessity for a quickly restriking arc explains our reason for utilizing an air-blast, or gas-blast, circuit-breaker 7, by which we mean, a circuit-breaker of a type in which the main contacts 8 and 9 are not normally immersed in an arc-quenching medium, the arc-quenching medium being supplied only at times when the arc is to be extinguished. In oil, for example, the breaker-contacts 8 and 9 would be constantly surrounded by a powerful arc-quenching medium, in the open position of the breaker, so that, after the initial breakdown of the gap, the arc could not readily restrike itself after every current-zero.

In accordance with our invention, it is necessary to utilize, as the protective gap, the open contacts of a breaker in which the arc-quenching medium can be turned on and off, at will, and is usually off; and we refer to such a breaker as an air-blast, or gas-blast breaker, referring to the blast so being composed of air or gas, including, by that terminology, any gaseous or vaporizable or de-ionizing medium which can be supplied to the gap, in copious quantities, at will, but which is normally not supplied to the gap, or not present at the gap, in quantities sufficient to readily de-ionize or extinguish an arc. We believe that it is new to thus utilize the open contacts of an air-blast circuit-breaker as the protective gap for a series capacitor 1.

The air-blast circuit-breaker 7 may take any one of several different forms. The form shown in the drawing utilizes a cylindrical insulating housing-member 11, which may be of porcelain, having a perforated metal cap 12, to which is connected a depending metal tubular member 13 having a restricted lower end which terminates in a ring 8 of a good arcing material, which constitutes the stationary contact-member of the breaker, and one of the electrodes of the protective gap. A suitable material for both of the gap-electrodes 8 and 9 is a sintered mixture of tungsten and silver, such as is commonly utilized on circuit-breakers. This material has the property of forming a tenacious, low-voltage arc, which can readily and quickly restrike itself after every current-zero, in the absence of an arc-extinguishing or deionizing agency.

The movable electrode 9 is illustrated as being mounted on the end of a piston-rod 15, carried by a piston 16 which is movable in a cylinder 17. The piston 16 is normally biased, by a spring 18, toward a stop 19 which limits the opening movement of the breaker and determines or fixes the length of the gap-spacing between the two electrodes 8 and 9.

The breaker 7 may be closed by admitting compressed air or gas underneath the piston 16, from a compressed-air tank 21, through a valve 22 which is electrically controlled by means of a closing-coil cc. When the breaker closes, the movable electrode 9 moves up into contact with the stationary electrode 8, and the breaker latches itself in the closed position, as by means of a spring-ring 23 in the piston, which opens out into a groove 24 in the wall of the piston-cylinder 17, in a manner which is known in the art. When the spring-ring 23 enters said groove 24, it holds itself therein with sufficient force to withstand the breaker-opening force exerted by the spring 18, so that the closing-valve 22 may be turned off.

To open the breaker 7, air is admitted to the space above the piston-cylinder 17 by means of a valve 26, under the control of a trip-coil TC, supplying compressed air (or other gas, or vaporizable medium) from the tank 21. Since the opening in the ring-shaped stationary electrode 8 is substantially plugged by the closed movable-electrode 9, the air-pressure applies itself to the top of the piston 16, as indicated by the arrow 27, and exerts sufficient force to dislodge the spring-latch 23 from its groove 24, so as to open the breaker. As soon as the movable contact 9 begins to move away from the stationary contact 8, some of the compressed air can begin to escape through the hole in the stationary electrode 8, as indicated by the arrow 28, so that, by the time the breaker is fully open, the air-blast will have extinguished the arc which is drawn between the two contact-members or electrodes 8 and 9, and the opening-valve 26 may be turned off.

The arcing material of the contact-tips 8 and 9 is readily able to withstand an arc for several cycles without undue pitting or damage; and in accordance with our invention, we utilize the breaker, in its open position, with the air-blast turned off, as an arcing-gap; and we subsequently turn on the air-blast, by energizing the trip-coil TC, but only after the line-current, in the line 2—3, has subsided to its full-load value, or to, say, 115% of its full-load value, after a fault-condition, which might entail a current-flow of 500% full-load current, or even considerably more, in some circumstances.

We accomplish our primary control of the trip-coil TC, for extinguishing the gap-arc after a gap-breakdown, by means of a gap-current relay GC and a undercurrent relay UC, which are illustrated as being energized from separate current-transformers 31 and 32 in the gap-circuit 4 and the line-circuit 2, respectively. The gap-current relay GC has a make-contact which is sufficiently designated by the relay-symbol GC; and the undercurrent relay UC has a make-contact UC and a back-contact UC. When current flows through the capacitor-bypassing gap 8—9, both relays GC and UC instantly pick up, and the undercurrent relay UC immediately re-calibrates itself by having its make-contact connect a shunting-impedance 33 across its energizing-coil UC, so that it will be easier to calibrate the relay to cause it to drop out just before the current subsides to full-load value, say 115%. The back-contact of the undercurrent relay UC, and the make-contact of the gap-current relay GC, are utilized, in series, to energize the trip-coil TC, so that, as soon as the line-current subsides from fault-magnitude to full-load magnitude, or less, or to 115% value, or less, the trip-coil TC will be energized, sending an air-blast across the gap 8—9, extinguishing the arc, thus deenergizing the gap-current relay GC and turning off the air-blast valve 26 by deenergizing the trip-coil TC, the valve being spring-closed.

The gap-spacing at 8—9 may be sufficient to cause the breakdown-voltage of the gap to be just the right amount to protect the series capacitor 1 against serious overvoltages, or, as shown, a somewhat wider gap-separation may be utilized, and some form of trigger-gap-means may be utilized for causing an arcing-over or breakdown of the main gap 8—9, as indicated at 35. The particular trigger-gap means which is shown at 35 is described and claimed in a copending application of R. E. Marbury, Serial No. 445,751, filed June 4, 1942, and it comprises an air-core choke-coil 36 in series with the gap-circuit 4, a small capacitor 37 which is connected in parallel to the coil 36 by means of trigger-gap 38, and an iron-core choke-coil 39, connected in series with the small capacitor 37 to energize the same at a predetermined multiple of the voltage appearing across the main series capacitor 1, the pilot-capacitor 37 and the choke-coil 39 being connected across the terminals of the main capacitor 1. When the pilot-capacitor reaches a sufficiently high voltage, the trigger-gap 38 breaks down and sets up a high-frequency oscillating-circuit including the pilot-capacitor 37 and the air-core coil 36, thereby applying, to the main gap 8—9, a sufficient voltage to cause breakdown.

As a back-up protective device, to protect the air-blast circuit-breaker against being called upon to withstand a continuous arcing of its gap 8—9 in the event that the line-current should continue, at fault magnitude, for a considerable period of time, we also provide a time-delay relay TR, which we have shown as being energized from the current-transformer 32. The time delay relay TR has two make-contacts 41, 42, and a back-contact 43, and it is provided with a means for delaying its pick-up action, such as a dashpot 44, for introducing a delay of 12 cycles (on the basis of a 60-cycle line), or any other desired time, in the responding-time necessary to close the make-contacts 41 and 42, and open the back-contact 43. The TR make-contact 42 is utilized to energize the closing-coil cc, thereby closing the breaker 7 and stopping the arcing at the contacts 8, 9. The closing-coil circuit is completed through the back-contact of a cutoff relay Y, the coil of which is energized by an auxiliary make-contact switch 7a on the breaker, when the breaker closes, thereby interrupting the closing-coil circuit.

When the breaker 7 closes, it also closes a second auxiliary make-contact switch 7a', which is in series with the back-contact 43 of the time-delay relay TR, so that if, and when the line-current finally subsides to full-load value, or to 115% of full-load value, the TR relay drops out and recloses its back-contact 43; and the back-contact 43, in series with the breaker-switch 7a', energizes the trip-coil TC which opens the breaker and at the same time extinguishes the arc at the main contacts 8 and 9. When the breaker opens, it opens its auxiliary switch 7a' and deenergizes the trip coil TC.

The time-delay relay TR is illustrated as being provided with a recalibrating shunt 53, under the control of the TR make-contact 41, for facilitating the adjustment of the drop-out point to the 115% value, or other line-current value, in the manner described for the undercurrent relay UC.

While we have illustrated and described our invention in a single exemplary form of embodiment, we wish it understood that we are not limited to this particular form, as various changes and substitutions will be obvious to those skilled in the art. We desire, therefore, that the appended claims shall be accorded the broadest construction consistent with their language.

We claim as our invention:

1. The combination, with an alternating-current line-conductor, of a series capacitor, a gas-blast circuit-breaker, means for connecting the series capacitor in series-circuit relation to the line-conductor, means for providing a capacitor-bypassing circuit including the open contacts of the breaker as a protecting gap-device for protecting the capacitor against overvoltages, means for turning on the gas-blast long enough to extinguish the arc in the gap upon the subsidence of the line-current from excessive values to substantially full-load value, and means for, at times, closing the breaker.

2. The invention as recited in claim 1, characterized by the closing-means including a time-delay current-responsive relay with delaying means for causing it to respond only after a time greater than the normally expected time for the subsidence of the line-current.

3. The invention as defined in claim 1, characterized by the main contacts of the breaker having arcing-contacts of a material having a low arc-drop, a low arc-restriking voltage after each current-zero, and the ability to withstand the play of the arc for at least four cycles before extinction by the gas-blast.

4. The invention as defined in claim 1, in combination with trigger-gap means for controlling the breakdown point of the protecting gap-device in relation to the voltage appearing across the capacitor-terminals, said trigger-gap means including a trigger-gap, means for making the trigger-gap arc over in response to some predetermined overvoltage condition appearing across the capacitor-terminals, and means for causing the protecting gap-device to arc over when the trigger-gap arcs over.

5. The combination, with an alternating-current line-conductor, of a series capacitor, a gas-blast circuit-breaker, means for connecting the series capacitor in series-circuit relation to the line-conductor, means for providing a capacitor-bypassing circuit including the open contacts of the breaker as a protecting gap-device for protecting the capacitor against overvoltages, means responsive to an arcing condition of the gap-device for turning on the gas-blast at a time when capacitor-protection is no longer needed, and means for, at times, closing the breaker.

6. The combination, with an alternating-current line-conductor, of a series capacitor, a gas-blast circuit-breaker, means for connecting the series capacitor in series-circuit relation to the line-conductor, means for providing a capacitor-bypassing circuit including the open contacts of the breaker as a protecting gap-device for protecting the capacitor against overvoltages, means responsive to a predetermined overcurrent condition in the bypassing circuit and a predetermined undercurrent condition in the line-conductor, for causing a gas-blast operation of the circuit-breaker, and means for, at times, closing the breaker.

7. The invention as recited in claim 5, characterized by the closing-means including a time-delay current-responsive relay with delaying means for causing it to respond only after a time greater than the normally expected time for the subsidence of the line-current.

8. The invention as recited in claim 6, characterized by the closing-means including a time-delay current-responsive relay with delaying means for causing it to respond only after a time greater than the normally expected time for the subsidence of the line-current.

9. The combination, with an alternating-current line-conductor, of a series capacitor, a gas-blast circuit-breaker, means for connecting the series capacitor in series-circuit relation to the line-conductor, disconnecting and bypassing connectors for at times disconnecting the series capacitor from the line, means for providing a capacitor-bypassing circuit including the open contacts of the breaker as a protecting gap-device for protecting the capacitor against overvoltages, means for turning on the gas-blast long enough to extinguish the arc in the gap upon the subsidence of the line-current from excessive values to substantially full-load value, and means for, at times, closing the breaker to enable the disconnecting and by-passing connectors to be operated while service is maintained on the line.

10. The combination, with an alternating-current line-conductor, of a series capacitor, a gas-blast circuit-breaker, means for connecting the series capacitor in series-circuit relation to the line conductor, disconnecting and bypassing connectors for at times disconnecting the series capacitor from the line, means for providing a capacitor-bypassing circuit including the open contacts of the breaker as a protecting gap-device for protecting the capacitor against overvoltages, means responsive to an arcing condition of the gap-device for turning on the gas-blast at a time when capacitor-protection is no longer needed, and means for, at times, closing the breaker to enable the disconnecting and bypassing connectors to be operated while service is maintained on the line.

11. The combination, with an alternating-current line-conductor, of a series capacitor, a gas-blast circuit-breaker, means for connecting the series capacitor in series-circuit relation to the line-conductor, disconnecting and bypassing connectors for at times disconnecting the series capacitor from the line, means for providing a capacitor-bypassing circuit including the open contacts of the breaker as a protecting gap-device for protecting the capacitor against overvoltages, means responsive to a predetermined overcurrent condition in the bypassing circuit and a predetermined undercurrent condition in the line-conductor, for causing a gas-blast operation of the circuit-breaker, and means for, at times, closing the breaker to enable the disconnecting and bypassing connectors to be operated while service is maintained on the line.

RALPH E. MARBURY.
LEON R. LUDWIG.
BENJAMIN P. BAKER.